(12) United States Patent
Kusbel et al.

(10) Patent No.: US 11,886,732 B2
(45) Date of Patent: Jan. 30, 2024

(54) DATA STORAGE SERVER WITH MULTI-MEMORY MIGRATION

(71) Applicant: Seagate Technology LLC, Cupertino, CA (US)

(72) Inventors: Paul F. Kusbel, Longmont, CO (US); John E. Moon, Superior, CO (US)

(73) Assignee: Seagate Technology LLC, Fremont, CA (US)

( * ) Notice: Subject to any disclaimer, the term of this patent is extended or adjusted under 35 U.S.C. 154(b) by 372 days.

(21) Appl. No.: 15/420,785

(22) Filed: Jan. 31, 2017

(65) Prior Publication Data

US 2018/0217778 A1    Aug. 2, 2018

(51) Int. Cl.
*G06F 3/06* (2006.01)

(52) U.S. Cl.
CPC ............ *G06F 3/0649* (2013.01); *G06F 3/061* (2013.01); *G06F 3/0685* (2013.01)

(58) Field of Classification Search
CPC ....... G06F 3/0649; G06F 3/061; G06F 3/0685
USPC .................................................. 711/112, 122
See application file for complete search history.

(56) References Cited

U.S. PATENT DOCUMENTS

| | | | |
|---|---|---|---|
| 7,092,461 B1 | 8/2006 | Minnis et al. | |
| 7,433,311 B1 * | 10/2008 | Kalyanasundaram | H04L 41/5029 370/235 |
| 7,844,575 B2 | 11/2010 | Fukuda et al. | |
| 8,527,467 B2 | 9/2013 | Shmueli | |
| 8,880,835 B2 | 11/2014 | Benhase et al. | |
| 9,054,092 B2 | 6/2015 | Gallegos et al. | |
| 9,116,914 B1 * | 8/2015 | Muthirisavenugopal | G06F 16/185 |
| 9,372,630 B2 | 6/2016 | Guo et al. | |
| 9,489,137 B2 | 11/2016 | Lewis et al. | |
| 9,898,224 B1 * | 2/2018 | Marshak | G06F 3/0647 |
| 10,021,185 B1 * | 7/2018 | Kleinschnitz, Jr. | G06F 9/5011 |
| 10,223,025 B1 * | 3/2019 | Faibish | G06F 3/0604 |
| 2008/0229020 A1 * | 9/2008 | Plamondon | H04L 67/2847 711/122 |
| 2010/0293337 A1 * | 11/2010 | Murphy | G06F 12/0897 711/136 |
| 2012/0110259 A1 | 5/2012 | Mills et al. | |
| 2013/0080703 A1 * | 3/2013 | Kumagai | G06F 9/5072 711/117 |
| 2013/0117515 A1 | 5/2013 | Ashmore et al. | |
| 2013/0290598 A1 | 10/2013 | Fiske et al. | |

* cited by examiner

Primary Examiner — Michael Krofcheck
(74) Attorney, Agent, or Firm — Hall Estill Law Firm

(57) ABSTRACT

A data storage server may store a data packet generated by a client in a first server memory prior to the data packet being migrated to a third server memory of the data storage server by a server controller in response to a server data migration module. The data packet may be moved to satisfy a quality of service agreement between a host and the client. The data packet can be proactively copied to a second server memory by the server controller in response to the migration of the data packet from the first to the third server memories.

20 Claims, 2 Drawing Sheets

DATA STORAGE SERVER WITH MULTI-MEMORY MIGRATION

SUMMARY

A data storage server, in accordance with assorted embodiments, consists of first, second, and third memories connected to a controller and a data migration module. The controller stores a data packet generated by a client in a first server memory prior to the data packet being migrated to a third server memory in response to the data migration module. The data packet is moved to satisfy a quality of service agreement between a host and the client. The data packet is proactively copied to the second memory by the controller in response to the migration of the data packet from the first to the third memories.

A data storage server may store a first data packet generated by a first client in a first memory of a data storage server that consists of first, second, and third memories connected to a controller, a data migration module, and a prediction module. A first performance metric is determined with the data migration module by comparing a cost per unit of data storage with a data latency rate provided by the respective first and third memories. A second performance metric is then predicted for the first data packet with the prediction module prior to copying the first data packet to the second memory proactively as directed by the prediction module and migrating the first data packet from the first memory to the third memory with the controller in response to first and second performance metrics. The first data packet is moved to satisfy a predetermined performance threshold between a host and the first client.

In some embodiments, a data storage server has first, second, and third memories connected to a controller, a data migration module, and a prediction module. The controller is configured to proactively copy of a data packet in the second memory in response to the data migration module triggering the data packet being moved from the first memory to the third memory to satisfy a quality of service agreement between a host and a client when the client originated the data packet.

DETAILED DESCRIPTION

Recent advancements have made the generation and transfer of data easier than ever. Some entities, such as large corporations, can generate and analyze tremendous amounts of data to optimize research, development, logistics, and other business operations. While systems exist with capacity to store and retrieve large amounts of data in remote data storage servers as part of a cloud computing system, storing data in memory with low data transfer latency can be expensive in terms of cost of data storage. As such, various embodiments are directed to structures and methods of intelligently handling data in a data storage server to provide a balance between data transfer latency and cost of data storage.

Cloud service providers (CSPs) incorporate business models that utilize the concept of service level agreements (SLAs). SLAs are contractual agreements between CSPs and their clients regarding the quality of service (QoS) when retrieving data. In particular, the SLA addresses data transfer latency when retrieving data stored in a data storage server of the CPS. Per the SLA, the client pays for a guarantee that the data transfer latency when retrieving their data is no greater than specified in the SLA, otherwise there are financial consequences to the CSP.

One difficulty with the SLA business model is that the data transfer latency needs of a client can vary over time for various amounts and types of data. For instance, a client collecting large amounts of data for business analytics will have stringent data latency requirements soon after the data is collected, such as when real-time data analysis is being conducted. However, after a given amount of time, the data is not accessed as frequently and becomes stale, which does not require as stringent data transfer latency. In this situation, the client is in a conundrum as to whether or not pay higher costs per unit of data storage to ensure low data transfer latency or suffer relatively high data transfer latency with a lower cost per unit of data storage (MB, GB, TB, etc.).

Accordingly, a data storage server, capable of being used in a cloud computing environment for a CSP, is arranged to provide automatic migration of a client's data to balance the cost of data storage with the data transfer latency needed to sufficiently service the client's data access needs. As a result, the CSP provides automatic reduced pricing to the client while meeting the CSP's QoS requirements. It is noted that the QoS of the SLA between the client and CSP will be structured to allow automatic data migration without client prompting and allow varying data transfer latencies.

Figure 1:
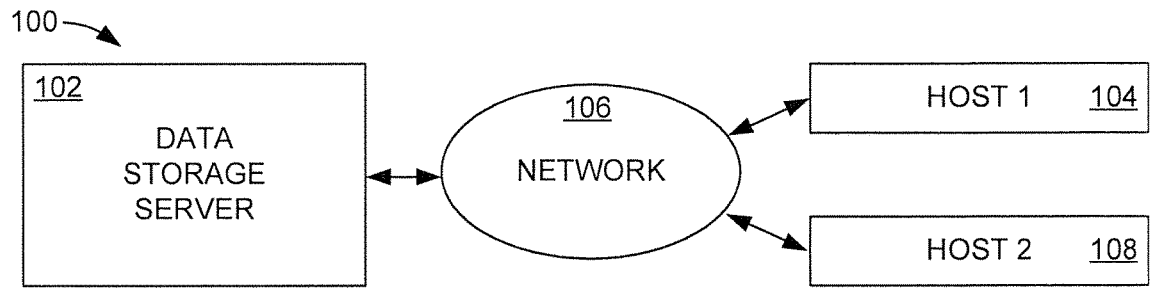
FIG. 1 displays a block representation of an example data storage system in which various embodiments may be practiced.

FIG. 1 displays an example data storage system 100 where assorted aspects of the present disclosure can be practiced in accordance with some embodiments. The system 100 has at least one data storage server 102 connected to one or more hosts 104 via a wired or wireless network 106. A data storage server 102 can temporarily and permanently store data that can be retrieved by a local, or remote, host 104 at will. It is contemplated that the network 106 allows multiple hosts 104 and 108 to concurrently, or independently, access the data storage server 102, such as to transfer data into or out of the memory of the server 102.

Figure 2:
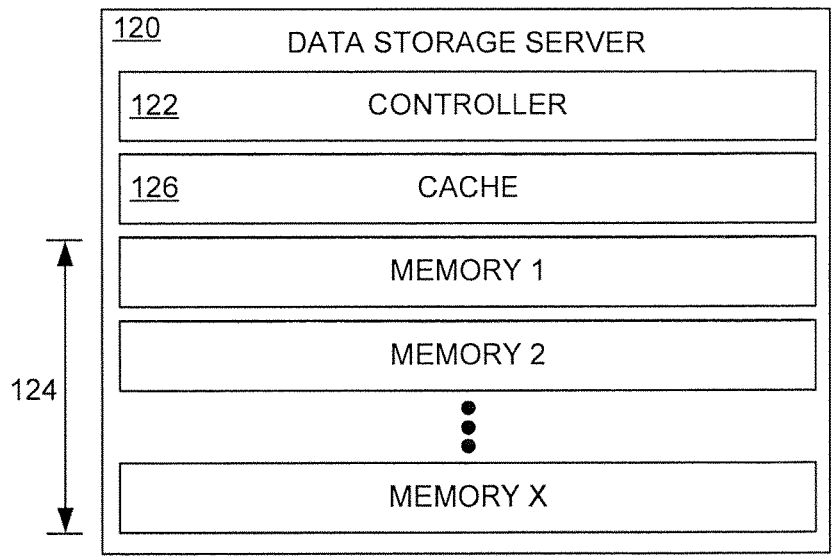
FIG. 2 is a block representation of an example data storage server that may be employed in the data storage system of FIG. 1.

The ability to connect the data storage server 102 to any number of remote hosts 104/108 allows the data storage system 100 to service a number of different clients concurrently. However, such connectivity often corresponds with increasing amounts of data with varying SLAs, QoS, priority, and size. FIG. 2 represents an example data storage server 120 that may be utilized by the data storage system 100 of FIG. 1 in accordance with various embodiments. The data storage server 120 has at least one local controller 122, such as a microprocessor, that directs data to, and from, a memory array 124 that consists of a plurality of different non-volatile memories (1-X).

The server controller 122 can utilize one or more cache locations 126 to temporarily store data. It is contemplated that the cache locations 126 are volatile memory that has a capacity that is less than any one of the memories of the memory array 124, but such configuration is not required. In some embodiments, the data storage server 120 is physically housed within a single housing, such as a storage enclosure or rack. With or without the cache memory 126, the server controller 122 can migrate data between memories of the memory array 124 to provide a balance between cost of data storage and the data transfer capabilities of the various memories of the memory array 124 while meeting the SLA and QoS between the client that owns the data and the CSP that owns the data storage server 120.

Figure 3:
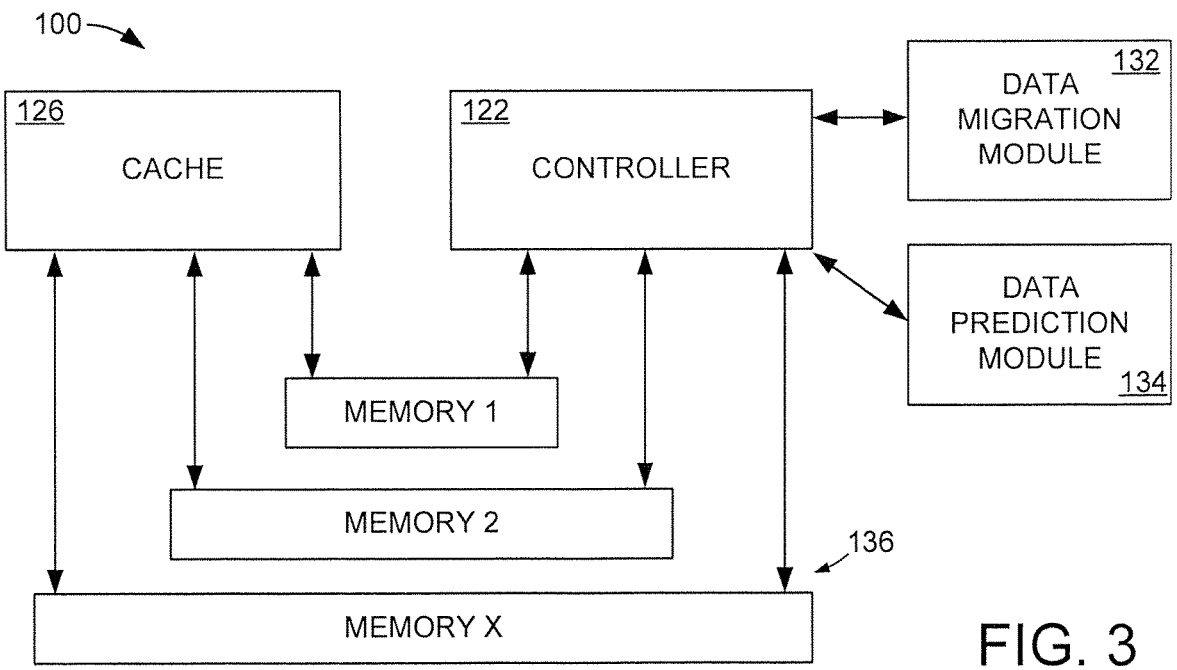
FIG. 3 depicts a block representation of a portion of an example data storage server arranged in accordance with some embodiments.

FIG. 3 illustrates a portion of an example data storage server 130 that may be employed in the data storage system 100 of FIG. 1. One or more controllers 122 can be connected to a data migration module 132, prediction module 134, and at least one cache 126. The data migration 132 and prediction 134 modules may be separate microprocessors, application specific integrated circuits (ASIC), or portions of a single controller 122. The controller 122 can direct data accesses to, and from, the separate non-volatile memories that collectively provide a server memory array 136. Such data accesses may go through one or more cache 126 locations, but cache storage is not required.

With the data migration module 132, the controller 122 can identify the data transfer latency needed for a data packet to satisfy the QoS of an SLA. The migration module 132 can utilize various performance metrics, such as write count, read count, frequency of data accesses, data packet size, and source client, to determine which memory of the memory array 136 best satisfies the QoS while minimizing the cost of data packet storage. That is, the data migration module 132 can continuously monitor the performance metrics of data stored in, and soon to be stored in, the memory array 136 and determine the best non-volatile memory location in the array 136 to satisfy the QoS without unduly providing low data transfer latency that corresponds with high data storage cost to the client.

The data migration module 132 operates reactively in response to the logged performance metrics associated with, or assigned to, a data packet. It is noted that a data packet with no performance metrics or QoS can be stored to a default location, such as cache 126, until performance metrics and/or QoS are procured. The retroactive nature of the data migration module 132 allows data to be moved between memories of the memory array 136 in response to prescribed characteristics. However, migrating data based on past activity does not always conform to future data access demands. For instance, data that hasn't been accessed frequently may be moved to a slower memory of the memory array 136 that cannot sufficiently satisfy the QoS of a client in the event that data is frequently accessed. In that situation, the client would have to wait until the migration module 132 recognizes the change in data status and moves the data to a faster memory of the memory array 136.

Hence, the prediction module 134 of the data storage server 130 can proactively direct data packet management via the controller 122 to mitigate the potential for QoS not being met. As a non-limiting example, if the data migration module 132 only moved data retroactively after data has been accessed, data may be migrated to a slower memory prior to the client demanding the data at a frequency that necessitates a faster memory and lower data transfer latency per the client's QoS. Thus, the prediction module 134 allows the data storage server 130 to proactively handle the migration of data packets, which can be one or more sequential logical block addresses of user data, between different memories of the memory array 136 to mitigate the risk of the client's QoS being breached.

Figure 4:
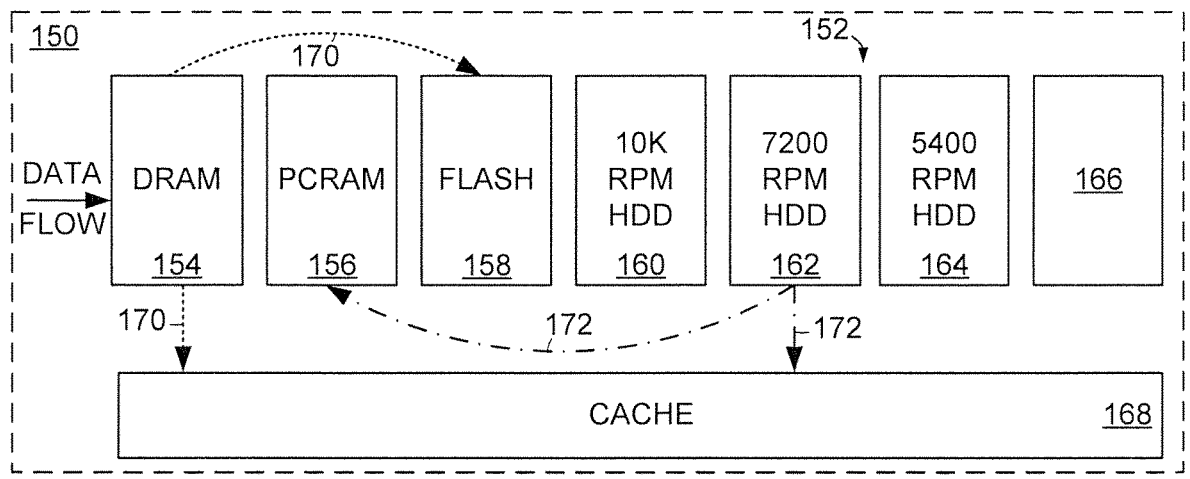
FIG. 4 represents a portion of an example data storage server configured in accordance with various embodiments.

FIG. 4 conveys a block representation of a portion of an example data storage server 150 that is configured and operated in accordance with some embodiments as part of a data storage system, such as system 100 of FIG. 1. The server 150 has at least one memory array 152 consisting of several independent and physically separate non-volatile memories in which a local, or remote, controller 122 can direct data to, and from. While not limiting, a memory array 152 of the server 150 can have a spectrum of different memory types that provide different data transfer latencies. In some embodiments, the assorted memories of the array 152 are configured to provide data transfer latencies that are uniformly distributed, such as 5 seconds, 4 seconds, 3 seconds, 2 seconds, 1 second, 0.5 seconds, and 0.1 seconds of latency, which may correspond with varying data transfer rates, such as 2500 MB/s, 2000 MB/s, 1500 MB/s, 1000 MB/s, 500 MB/s, 250 MB/s, and 50 MB/s.

As data enters the data storage server 150, the controller 122 determines what memory best satisfies the SLA and QoS of the client that originated the data while providing the lowest cost per unit of data stored. As such, the controller 122 may initially store data in the memory that has the fastest, slowest, or average data transfer latency. A non-limiting example initially stores data in the fastest memory, which can be a power loss protected dynamic random access memory (DRAM) 154. The DRAM memory may serve as a temporary, or permanent, destination while the controller 122 employs the data migration module 132 and prediction module 134 to determine if another memory of the array 152 provides ample data transfer latency for a lower cost per unit of data stored.

It is contemplated that the controller 122 continuously evaluates data stored in the array 152 regardless of whether data accesses, such as updates, re-writes, and reads, are conducted. The constant evaluation of data provides the controller 122 ample information to generate performance metrics that indicate what data transfer latency, and memory, provides the lowest risk for a breach of the client's SLA and QoS for the least cost. That is, the controller 122 can utilize retroactive data information as well as predicted statistics to balance the likelihood of data being requested at a rate that overwhelms a memory's data transfer capability and consequently delays data retrieval beyond the acceptable QoS threshold with the cost of storing data in a given memory. As a result, the controller 122 may store data in a faster, or slower, memory despite the data historically being hot (accessed frequently) or cold (accessed infrequently).

In the event incoming data is initially hot and demand the fastest memory, the controller 122 stores the data in the DRAM 154 until the data migration 132 and prediction 134 modules indicate that the data is to be moved to the next fastest memory, which can be a phase change solid-state memory (PCRAM) 156. The memory array 152 can be arranged so that a NAND flash solid-state memory (FLASH) 158 provides the next fastest data transfer latency followed by a high speed hard disk drive (10k RPM HDD) 160, medium speed hard disk drive (7200 RPM HDD) 162, and low speed hard disk drive (5400 RPM HDD) 164. One or more archive memories 166, such as tape data storage or shingled magnetic recording hard disk drive (SMR HDD), can be used to store data with the lowest need for fast data retrieval.

It is noted that multiple different types of NAND memory 158 can be concurrently utilized in the server 150. For instance, single level NAND memory cells, and arrays of cells, can be employed for some data storage applications that are determined by the controller 122 to need faster service while multi-level NAND memory cells, and arrays of cells, can be employed for some data storage where capacity is emphasized over data access speed. The ability to selectively store data in different types of memory allows the server 150 to provide a diverse range of data storage characteristics, such as speed, capacity, cost, and error rate, which can optimize the performance for a client and the available resources for a host.

While migration of data between memories of the array 152 based on retroactive and predicted information can provide a cost efficient balance with data retrieval performance, it is noted that migrating data between memories can become a liability for breach of the client's SLA and QoS if the data is requested during the migration. Accordingly, various embodiments utilize one or more cache memories 168 to prevent data migration from causing a QoS breach. As illustrated by segmented data path 170, the controller 122 can direct a data packet from the fastest DRAM 154 memory to the slower FLASH 158 memory while a copy of the data packet is stored in the temporary cache 126. Segmented data path 172 shows how migration to a faster memory can also be accompanied by copying the migrated data packet to cache 168, which may occur prior, during, or after the migration to the faster PCRAM memory.

The ability to direct any data accesses to the cached copy while a data packet is being moved between memories ensures the QoS will be met, as the cache memory 168 can be a very fast volatile type of memory. It is contemplated that controller 122, migration module 132, and prediction module 134 can proactively cache a data packet without the data being moved between memories of the array 152. Such proactive caching of a data packet allows large packets of data to be moved as well as migrations to, and from, memories with different data transfer rates. Through the evaluation of logged performance metrics by the migration module 132 and of predicted performance metrics by the prediction module 134, a client can enjoy lower overall cost of data storage without concern for high data transfer latencies, regardless of the history of a data packet or the memory in which the data packet is stored.

Figure 5:
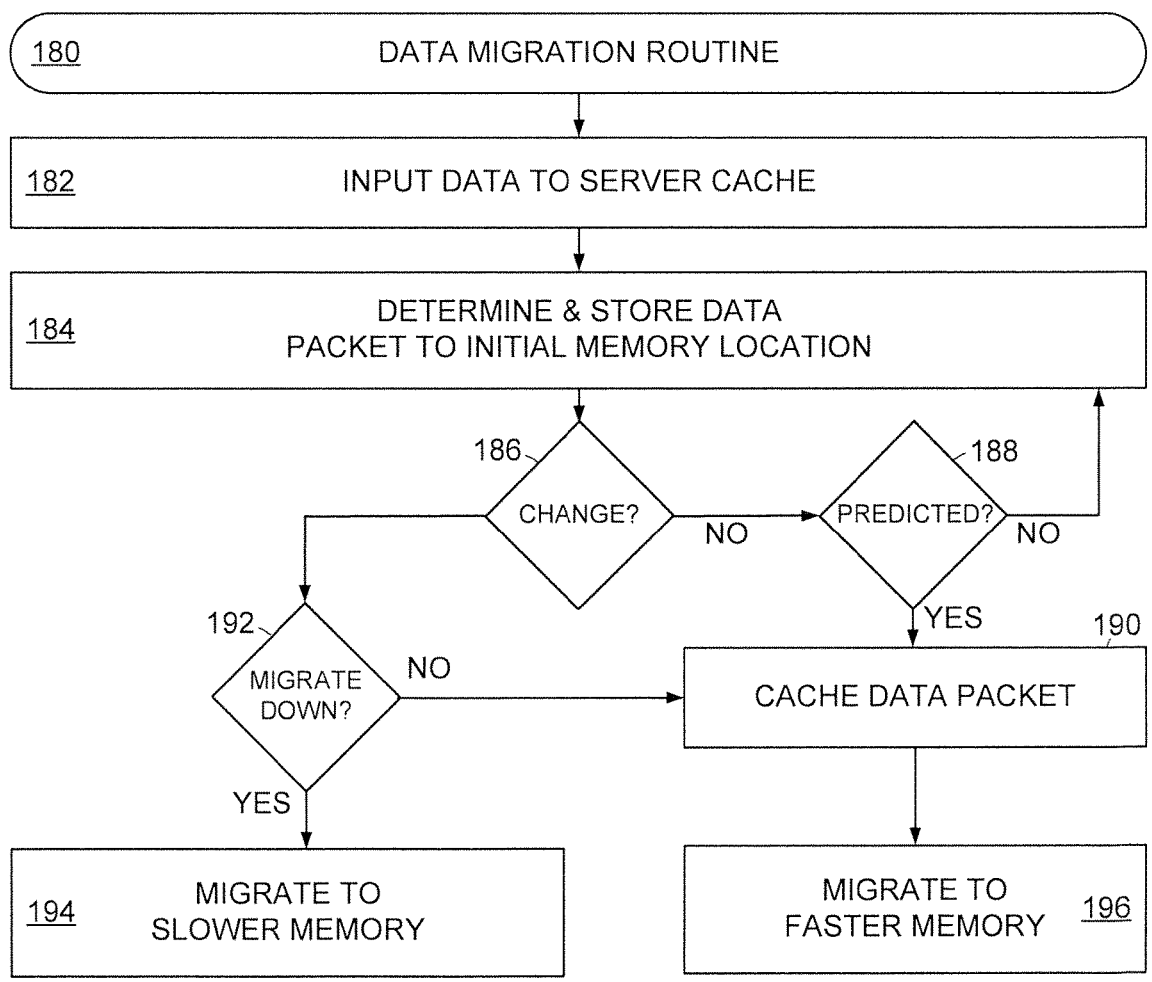
FIG. 5 conveys a flowchart of an example data migration routine that can be carried out by the data storage system of FIG. 1 in accordance with some embodiments.

FIG. 5 is a flowchart of an example data migration routine 180 that may be executed by the data storage system and servers of FIGS. 1-4. The routine 180 can begin with step 182 inputting data in a server cache. It is contemplated that the server cache is resident in a data storage server of a data storage system with one or more controllers directing at least one data packet in step 182 to a temporary server cache prior to a client request to store the data packet remotely in the server.

In some embodiments, routine 180 inputs a data packet directly to a non-volatile memory of the data storage server, as determined by the data migration and prediction modules in step 184, without first caching the data in step 182. Step 184 can evaluate any number of variables pertaining to the incoming data packet, such as packet size, LBAs, SLA, QoS, required data transfer latency, and data access frequency, to determine the initial non-volatile memory storage location within the data array of the data storage server. As generally described in FIG. 4, initial data packet storage can be in any one of several different types of non-volatile memory where any number and type of data access operations (reads, writes, updates, etc.) are conducted over time.

After a data packet is initially stored in a data storage server, decision 186 can continuously, routinely, or sporadically evaluate if a change in storage location is called for. Decision 186 may concurrently or independently consult the data migration and/or data prediction modules to determine if the cost of data storage is balanced with the data transfer latency provided by the data packet's current storage location. In the event no change in the performance metrics of the data packet are indicated retroactively via the migration module, decision 188 then evaluates if the performance metrics of the data packet are predicted to change, as indicated via the prediction module. A predicted change triggers step 190 to cache at least a portion of the data packet while no predicted change in decision 188 returns the routine 180 to step 184 where new data is inputted and current data is evaluated for changes in decision 186.

If the data migration module registers one or more logged performance metrics for the data packet being above a predetermined threshold or the data prediction module predicting the future performance metrics will likely change, decision 186 progresses to decision 192 where the destination non-volatile memory location is determined. Decision 192 can take into account the past performance of the data packet, the client's SLA and QoS with the CPS, and cost of data for the different memory locations of the server memory array to direct the server controller if a faster, or slower, memory location provides a balance of cost and data transfer latency. It is noted that the balance determined in step 192 can conform to predetermined rules, tolerances, and predicted performance that minimizes the risk of the QoS being breached while minimizing the overall cost of the data packet.

A determination that a slower memory destination provides a better balance of cost to data transfer latency than the current location of the data packet advances to step 194 where the data packet is migrated. Step 194 may coincide with all, or part, of the data packet being cached. A determination in decision 192 that a memory location with a faster data transfer latency initially caches the data packet in step 190 prior to step 196 migrating the data packet to the faster memory designated by the data migration and prediction modules. With the migration of the data packet within the memory array of the data storage server, the routine 180 can terminate or cyclically return to any step or decision of the routine 180.

The inclusion of predictive performance metrics with logged performance metrics allows a server controller to intelligently store data while minimizing cost to the client. The proactive caching of data while data migrations occur further intelligently store data and adapt to changing data conditions, such as data accesses, data packet size, and updated client-CPS SLA. Through the adaptation and intelligent storage of data packets for numerous different clients, a data server can provide cloud storage that optimizes data transfer latency for minimal cost to the respective clients.

What is claimed is:
1. A method comprising:
   storing a data packet generated by a client in a first memory of a data storage server having the first memory, a second memory, a third memory, a controller, a data migration module, and a prediction module, each of the first, second and third memories having a different data transfer latency and associated cost of data storage, the data migration module configured to reactively identify a minimum data transfer latency required for the data packet to satisfy a quality of service (QoS) agreement between a host and the client based on logged performance metrics associated with the data packet, the prediction module configured to proactively predict a change in future access require- ments for the data packet by the client based on predictive performance metrics associated with the data packet;
copying the data packet to the second memory proactively as directed by the prediction module;
concluding, with the data migration module, that storage of the data packet in the second memory will satisfy the QoS agreement;
determining, with the data migration module, that storage of the data packet in the third memory will satisfy the QoS agreement; and
migrating the data packet to the third memory with the controller as directed by the data migration module in response to the third memory providing storage of the data packet with a lower cost of data storage to the client than the second memory, and in response to the prediction module predicting no change in the future access requirements for the data packet by the client based on the predicted performance metrics.

2. The method of claim 1, wherein the data packet is proactively copied from the first memory to the second memory prior to the data packet being migrated from the first memory to the third memory, the second memory comprising a data cache to facilitate a data transfer required for the data packet to the client during the migration of the data packet from the first memory to the third memory.

3. The method of claim 1, further comprising not migrating the data packet to the third memory responsive to the prediction module predicting a change in the future access requirements for the data packet by the client based on the predicted performance metrics.

4. The method of claim 1, further comprising temporarily caching a copy of the data packet in a cache memory during the migrating of the data packet to the third memory, and servicing a request for the data packet from the client from the cache memory.

5. The method of claim 1, wherein the first and third memories are non-volatile.

6. The method of claim 1, wherein the second memory is a volatile memory.

7. The method of claim 1, wherein the quality of service agreement is part of a service level agreement between the client and the host.

8. The method of claim 1, wherein the third memory has a lower cost per unit of data storage than the first memory, and the data packet is migrated from the first memory to the third memory.

9. The method of claim 1, wherein the first memory has a lower cost per unit of data storage than the third memory, and the data packet is migrated from the first memory to the third memory.

10. A method comprising:
storing a data packet generated by a client in a first memory of a data storage server, the data storage server comprising first, second, and third memories connected to a controller, a data migration module, and a prediction module;
determining a cost per unit of data storage to the client with a data latency rate provided by each of the respective first, second and third memories based on logged performance metrics associated with the data packet;
predicting a change, if any, in a rate of future accesses by the client for the data packet with the prediction module based on predicted performance metrics;
copying the data packet to the second memory proactively as directed by the prediction module;
determining, with the data migration module, that each of the second memory and the third memory can satisfy a quality of service (QoS) agreement between a host and the client based on the costs and data latency rates associated with the second memory and the third memory; and
migrating the data packet from the first memory to the third memory with the controller in response to the logged performance metrics, the predicted performance metrics, and the third memory having a cost per unit of data storage to the first client lower than the second memory.

11. The method of claim 10, wherein the predicted performance metrics indicate a predicted increased demand for the data packet in the near future, and wherein the method further comprises confirming that the third memory can meet the predicted increased demand while satisfying the QoS agreement.

12. The method of claim 10, wherein the predicted performance metrics indicate no change in demand for the data packet in the near future, and wherein the method further comprises proceeding with the migration of the data packet to the third memory in response thereto.

13. The method of claim 10, wherein the logged performance metrics comprise a frequency of data accesses to the data packet.

14. The method of claim 10, wherein the logged performance metrics comprise a data packet size.

15. The method of claim 10, wherein the data packet is a first data packet, a second data packet from a second client is proactively copied to the second memory as directed by the prediction module prior to the second data packet being migrated from a fourth memory of the data storage server to the first memory.

16. The method of claim 10, wherein the logged performance metric comprises activity with the data packet logged by the controller.

17. The method of claim 10, wherein the second memory is a cache memory which makes available servicing of a data request for the data packet by the client during the migration of the data packet from the first memory to the third memory.

18. An apparatus comprising a data storage server having first, second, and third memories connected to a controller, a data migration module, and a prediction module, the controller configured to proactively copy a data packet received from a client from the first memory to the second memory to provide availability of the data packet for transfer from the second memory to the client during an evaluation operation in which the data migration module identifies a minimum data transfer latency required for the data packet to satisfy a quality of service (QoS) agreement between a host and the client based on logged performance metrics associated with the data packet and in which the prediction module proactively predicts future access requirements for the data packet by the client based on predictive performance metrics associated with the data packet, the controller further configured to migrate the data packet from the first memory to the third memory in response to the second memory having a greater cost per unit of data storage to the client than the third memory, the second memory and the third memory each satisfying the QoS agreement for both the logged performance metrics and the predictive performance metrics of the evaluation operation.

19. The apparatus of claim 18, wherein the data storage server is housed in a single data storage rack.

20. The apparatus of claim 18, wherein the first and third memories are different types of non-volatile memory, the first memory having a greater data transfer rate than the third memory, the second memory having at least as fast a data transfer rate as the first memory and serving as a cache location to store the data packet for data transfer operations with the client during the migration of the data to the third memory.

\* \* \* \* \*